United States Patent
Hiramatsu et al.

(10) Patent No.: US 9,503,695 B2
(45) Date of Patent: Nov. 22, 2016

(54) NETWORK SYSTEM HAVING SWITCH TRANSFERRING DATA

(71) Applicants: Takahiro Hiramatsu, Chiyoda-ku (JP); Hideo Kawamura, Chiyoda-ku (JP)

(72) Inventors: Takahiro Hiramatsu, Chiyoda-ku (JP); Hideo Kawamura, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 364 days.

(21) Appl. No.: 14/234,582

(22) PCT Filed: Nov. 28, 2012

(86) PCT No.: PCT/JP2012/080746
§ 371 (c)(1),
(2) Date: Jan. 23, 2014

(87) PCT Pub. No.: WO2013/081007
PCT Pub. Date: Jun. 6, 2013

(65) Prior Publication Data
US 2014/0152837 A1  Jun. 5, 2014

(30) Foreign Application Priority Data
Nov. 30, 2011 (JP) ................. 2011-262039

(51) Int. Cl.
*H04L 12/28* (2006.01)
*H04N 7/18* (2006.01)
*H04L 12/931* (2013.01)

(52) U.S. Cl.
CPC ............. *H04N 7/181* (2013.01); *H04N 7/18* (2013.01); *H04L 49/351* (2013.01)

(58) Field of Classification Search
CPC . H04N 7/181; H04L 12/4645; H04L 49/351; H04L 7/18
See application file for complete search history.

(56) References Cited

U.S. PATENT DOCUMENTS

| | | | | |
|---|---|---|---|---|
| 7,365,772 B2* | 4/2008 | Mizutani | ............... | H04N 7/181 348/159 |
| 2004/0145657 A1* | 7/2004 | Yamamoto | ............ | H04N 7/181 348/143 |
| 2008/0042826 A1* | 2/2008 | Hevia | .............. | G08B 13/19656 340/531 |
| 2010/0002705 A1* | 1/2010 | Takatori | ............. | H04L 12/4645 370/395.3 |
| 2011/0187867 A1* | 8/2011 | Hsieh | ....................... | H04N 7/18 348/159 |

FOREIGN PATENT DOCUMENTS

| | | |
|---|---|---|
| JP | 2003 324713 | 11/2003 |
| JP | 2006 54771 | 2/2006 |
| JP | 2006-287292 A | 10/2006 |
| JP | 2007 174208 | 7/2007 |

(Continued)

OTHER PUBLICATIONS

International Search Report Issued Mar. 5, 2013 in PCT/JP12/080746 Filed Nov. 28, 2012.

(Continued)

*Primary Examiner* — Abdelnabi Musa

(74) *Attorney, Agent, or Firm* — Oblon, McClelland, Maier & Neustadt, L.L.P.

(57) ABSTRACT

A video monitoring device has a function that receives a VLAN-ID-attached Ethernet frame transferred from an Ethernet switch, and that identifies a port to which a video cable of a monitoring camera which is a distribution source of the Ethernet frame is connected by referring to the VLAN-ID attached to the Ethernet frame.

16 Claims, 4 Drawing Sheets

(56) References Cited

FOREIGN PATENT DOCUMENTS

| JP | 2009-278317 A | 11/2009 |
| JP | 2010-178211 A | 8/2010 |
| JP | 2010 199911 | 9/2010 |
| JP | 2011 155445 | 8/2011 |
| WO | 2008 114364 | 9/2008 |

OTHER PUBLICATIONS

Office Action issued Feb. 9, 2016 in Japanese Patent Application No. 2014-171823 (with partial English language translation).

* cited by examiner

FIG.2

| Connected Devices | Port | VLAN·ID | ID Assignment | Transmission Source IP Address |
|---|---|---|---|---|
| Monitoring Camera 1-1 | Port 4-1 | 1001 | Assign | 10.1.1.101 |
| Monitoring Camera 1-2 | Port 4-2 | 1002 | Assign | 10.1.1.102 |
| Monitoring Camera 1-3 | Port 4-3 | 1003 | Assign | 10.1.1.103 |
| Video Monitoring Device 7 | Port 4-4 | 1001, 1002, 1003 | Not Assign | 10.1.1.100 |

FIG.4

| Port | VLAN ID | Monitoring Camera | | | Virtual NIC | |
|---|---|---|---|---|---|---|
| | | Number | IP Address | Transmission Destination Address | Number | IP Address |
| Port 4-1 | 1001 | 1-1 | 10. 1. 1. 101 | 224. 1. 1. 201 | 20-1 | 10. 1. 1. 201 |
| Port 4-2 | 1002 | 1-2 | 10. 1. 1. 102 | 224. 1. 1. 202 | 20-2 | 10. 1. 1. 202 |
| Port 4-3 | 1003 | 1-3 | 10. 1. 1. 103 | 224. 1. 1. 203 | 20-3 | 10. 1. 1. 203 |

NETWORK SYSTEM HAVING SWITCH TRANSFERRING DATA

TECHNICAL FIELD

The present invention relates to a video monitoring system that receives shooting information (video and audio data) distributed from a monitoring camera, displays an image of a monitoring area, and records images in accordance with the shooting information.

BACKGROUND ART

In a video monitoring system, if there are a plurality of monitoring areas, monitoring cameras are installed at the plurality of monitoring areas, and video cables of the plurality of monitoring cameras are connected to input terminals of video equipment.

On this occasion, if the video cable of a monitoring camera is connected to a wrong input terminal, the monitoring camera of the distribution source of the shooting information acquired into the video equipment is mistaken. Thus, the video cable of each monitoring camera generally has physical tags (tags with the number of the input terminal to be connected) attached to its both ends (see Patent Document 1, for example).

In this case, a constructor or installer of the video monitoring system refers to the physical tags attached to both ends of the video cable of each monitoring camera, and connects the video cable to the right input terminal.

The video monitoring system, however, is made adaptive to a network, and when the shooting information of the monitoring camera is stored in an IP (Internet Protocol) packet and when an Ethernet frame (Ethernet is a registered trademark, which will not be mentioned from now on) including the IP packet is distributed, it is necessary to connect or install the video cables of the monitoring cameras by referring not to the tags mentioned above, but to a table showing correspondence between MAC (Media Access Control) addresses of the monitoring cameras and information about setup positions of the monitoring cameras.

PRIOR ART DOCUMENT

Patent Document

Patent Document 1: Japanese Patent Laid-Open No. 2003-324713 (FIG. 2).

DISCLOSURE OF THE INVENTION

Problems to be Solved by the Invention

As for the conventional video monitoring system with the foregoing configuration, it will be supposed that a constructor or the like skilled in the IP technique or Ethernet technique can easily connect or set the video cables of the monitoring cameras by referring to the correspondence between the MAC addresses of the monitoring cameras and the information about the setup positions of the monitoring cameras. However, there are a lot of constructors who are not skilled in the IP technique or Ethernet technique, which presents a problem of retarding the spread of video monitoring systems on an IP-adapted network.

The present invention is implemented to solve the foregoing problems. Therefore it is an object of the present invention to provide a video monitoring system capable of confirming the ports to which the video cables of the monitoring cameras are connected, and capable of confirming the connection destinations of the video cables by only looking at the physical tags attached to both ends of the video cables at the installation even on the IP-adapted network.

Means for Solving the Problems

A video monitoring system in accordance with the present invention comprises: one or more monitoring cameras that take a photograph of a monitoring area and distribute shooting information of the monitoring area; a network switch that includes a plurality of ports which accept connection of video cables of the monitoring cameras, that adds, when the shooting information distributed from a monitoring camera is input through a port, an ID corresponding to the port to the shooting information, and that transfers the ID-attached shooting information; and a video monitoring device with a function that identifies, when receiving the ID-attached shooting information transferred from the network switch, the port to which the video cable of the monitoring camera which is a distribution source of the shooting information is connected by referring to the ID attached to the shooting information.

Advantages of the Invention

According to the present invention, it is configured in such a manner that it comprises the network switch that includes a plurality of ports which accept connection of the video cables of the monitoring cameras, that adds, when the shooting information distributed from a monitoring camera is input through a port, the ID corresponding to the port to the shooting information, and that transfers the ID-attached shooting information, wherein the video monitoring device has the function that identifies, when receiving the ID-attached shooting information transferred from the network switch, the port to which the video cable of the monitoring camera which is a distribution source of the shooting information is connected by referring to the ID attached to the shooting information. Accordingly, it offers an advantage of being able to confirm the port easily to which the video cable of the monitoring camera is connected. In addition, even if the network is IP-adapted, since the physical tags indicating the port to be connected can be attached to both ends of the video cable, it has an advantage of being able to confirm the connection destination of the video cable by only looking at the tags.

BRIEF DESCRIPTION OF THE DRAWINGS

FIG. 2 is a diagram showing a table exhibiting correspondence between ports, VLAN-IDs and the like;

FIG. 4 is a diagram showing a table exhibiting correspondence between ports, VLAN-IDs, monitoring cameras and virtual NICs.

BEST MODE FOR CARRYING OUT THE INVENTION

The best mode for carrying out the invention will now be described with reference to the accompanying drawings to explain the present invention in more detail.

Embodiment 1

Figure 1:
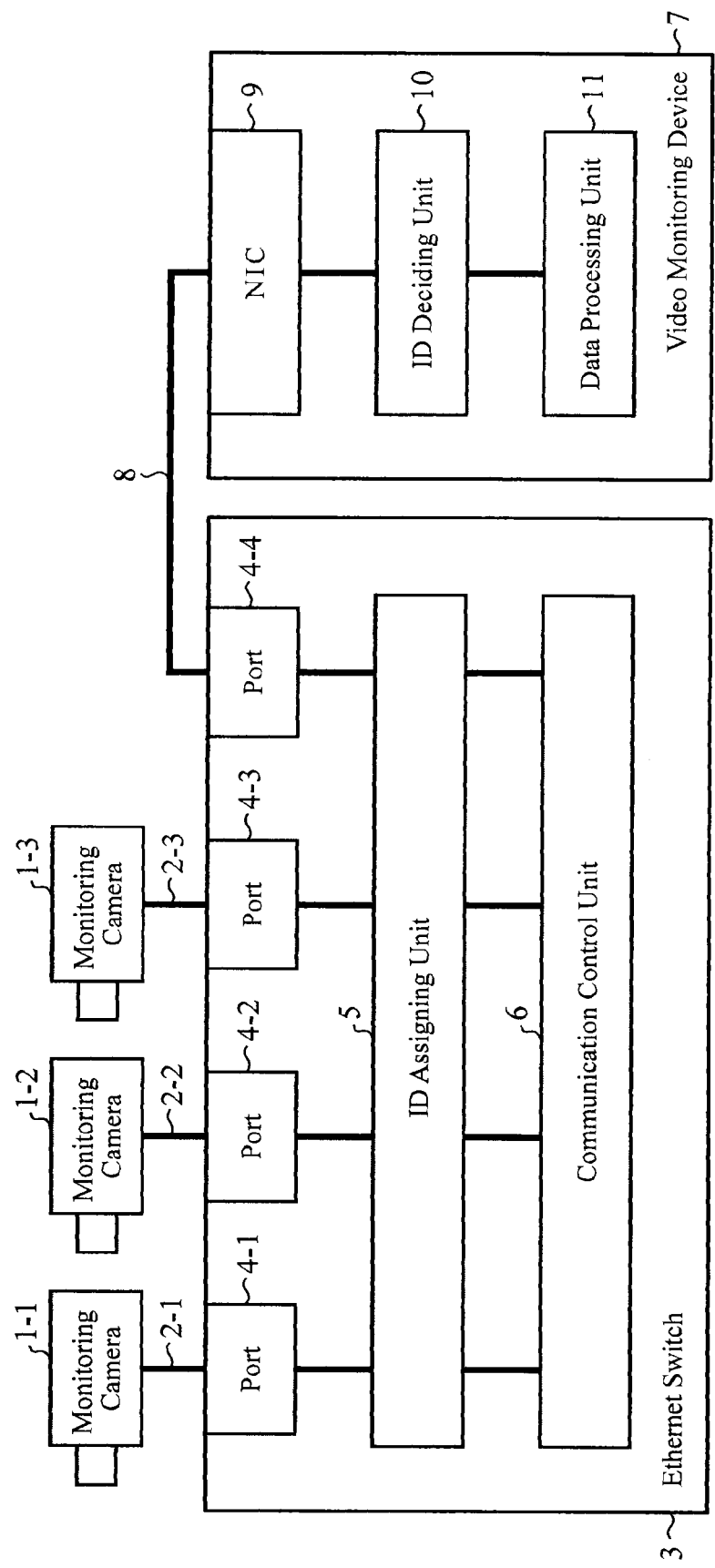
FIG. 1 is a block diagram showing a configuration of a video monitoring system of an embodiment 1 in accordance with the present invention.

FIG. 1 is a block diagram showing a configuration of a video monitoring system of an embodiment 1 in accordance with the present invention.

In FIG. 1, monitoring cameras 1-1-1-3 are photographing equipment that takes pictures of monitoring areas, stores the shooting information in an IP packet, and distributes an Ethernet frame containing the IP packet.

Although FIG. 1 shows an example with three monitoring cameras 1-1-1-3, if an Ethernet switch 3 which will be described later has five or more ports, four or more monitoring cameras 1 can be installed.

An Ethernet switch 3, which has ports 4-1-4-3 that accept connection of video cables 2-1-2-3 of the monitoring cameras 1-1-1-3, is a network device that assigns, when an Ethernet frame distributed from a monitoring camera 1 is input through a port 4, a VLAN-ID corresponding to the port 4 to the Ethernet frame, and transfers the ID-attached Ethernet frame to a video monitoring device 7. Incidentally, the Ethernet switch 3 constitutes a network switch.

The ports 4-1-4-3 of the Ethernet switch 3 are an input interface that accepts the connection of the video cables 2-1-2-3 of the monitoring cameras 1-1-1-3, and a port 4-4 is an input interface that accepts a video cable 8 of the video monitoring device 7.

In the example of FIG. 1, although the port 4-4 accepts the connection of the video cable 8 of the video monitoring device 7, a configuration is also possible in which the port 4-4 accepts the connection of one of the video cables 2-1-2-3 of the monitoring cameras 1-1-1-3, and one of the ports 4-1-4-3 accepts the connection of the video cable 8 of the video monitoring device 7.

An ID assigning unit 5 of the Ethernet switch 3, which comprises a semiconductor integrated circuit incorporating a CPU or comprises a single-chip microcomputer, executes processing that when an Ethernet frame distributed from a monitoring camera 1 is input through a port 4, refers to a table showing correspondence between the ports and VLAN-IDs (table of FIG. 2), identifies the VLAN-ID corresponding to the port 4, and assigns the VLAN-ID to the Ethernet frame.

A communication control unit 6 of the Ethernet switch 3 is a communication device that refers to the table of FIG. 2, recognizes that the transfer destination of the Ethernet frame to which the VLAN-ID is attached by the ID assigning unit 5 is the video monitoring device 7, and transfers the VLAN-ID-attached Ethernet frame to the video monitoring device 7.

In addition, when an Ethernet frame containing an IP packet that stores the control information (information indicating an IP address to be set to the monitoring camera 1, for example) distributed from the video monitoring device 7 is input through the port 4-4, the communication control unit 6 executes the processing that refers to the table of FIG. 2, recognizes the monitoring camera 1 of the transfer destination of the Ethernet frame, and transfers the Ethernet frame.

The video monitoring device 7 has functions that reads, when receiving the VLAN-ID-attached Ethernet frame from the Ethernet switch 3, the VLAN-ID attached to the Ethernet frame using a RAW socket, refers to the VLAN-ID and identifies the port 4 to which the video cable 2 of the monitoring camera 1, which is the distribution source of the Ethernet frame, is connected.

An NIC (Network Interface Card) 9 of the video monitoring device 7 is an interface that receives an Ethernet frame.

An ID deciding unit 10 of the video monitoring device 7, which comprises a semiconductor integrated circuit incorporating a CPU or comprises a single-chip microcomputer, executes the processing that reads, when the NIC 9 receives a VLAN-ID-attached Ethernet frame, the VLAN-ID attached to the Ethernet frame using a RAW socket, refers to the table of FIG. 2, and identifies the port 4 corresponding to the VLAN-ID, thereby identifying the port 4 to which the video cable 2 of the monitoring camera 1, which is the distribution source of the Ethernet frame, is connected.

A data processing unit 11 of the video monitoring device 7, which comprises a semiconductor integrated circuit incorporating a CPU or comprises a single-chip microcomputer, for example, executes processing that displays the port 4 identified by the ID deciding unit 10 on a display not shown. Alternatively, the data processing unit 11 performs, on the shooting information stored in the IP packet contained in the Ethernet frame, media processing corresponding to the port 4 (such as setting prescribed image size and/or picture quality, displaying (including output of the audio) and/or recording of the video indicated by the shooting information, or displaying and/or recording of the camera-number-attached video corresponding to the VLAN-ID).

Next, the operation will be described.

It is assumed in the embodiment 1 that physical tags describing the ports 4-1-4-3 to be connected are attached to both ends of the video cables 2-1-2-3 of the monitoring cameras 1-1-1-3, for example.

In the embodiment 1, even if the network is IP-adapted, the ports to which the video cables 2-1-2-3 of the monitoring cameras 1-1-1-3 can be connected are restricted to specified ports. Accordingly, the physical tags describing the ports to be connected can be attached to both ends of the video cables 2-1-2-3.

In this case, a constructor or installer of the video monitoring system refers to the tags attached to both ends of the video cables 2-1-2-3 of the monitoring cameras 1-1-1-3, confirms the ports 4-1-4-3 to which the video cables 2-1-2-3 are to be connected, and connects the video cables 2-1-2-3 to the right ports 4-1-4-3.

However, confirming the ports 4-1-4-3 to which the video cables 2-1-2-3 are to be connected by referring to the tags cannot exclude the possibility of a connection error completely. Accordingly, the video monitoring device 7 is provided with a function of identifying the port 4 to which the monitoring camera 1 which is the distribution source of the Ethernet frame is connected.

When the video cables 2-1-2-3 of the monitoring cameras 1-1-1-3 are connected to the ports 4-1-4-3 of the Ethernet switch 3, respectively, and the monitoring camera 1-1 takes a photograph of the monitoring area, it stores the shooting information in a packet such as the RTP (Realtime Streaming Protocol), and stores the packet in an IP packet.

Then the monitoring camera 1-1 stores the IP packet in an Ethernet frame and distributes the Ethernet frame.

On this occasion, when the video cable 2-1 of the monitoring camera 1-1 is connected to the port 4-1 of the Ethernet switch 3 which is the right connection destination, the Ethernet frame distributed from the monitoring camera 1-1 is input to the Ethernet switch 3 through the port 4-1.

When the Ethernet frame distributed from the monitoring camera 1-1 is input through the port 4-1, the ID assigning unit 5 of the Ethernet switch 3 refers to the table of FIG. 2 showing the correspondence between the ports and the VLAN-IDs (IDs defined by IEEE802.1Q standards), identifies the VLAN-ID corresponding to the port 4-1, and assigns the VLAN-ID to the Ethernet frame.

FIG. 2 is a diagram showing an example of a table showing the correspondence between the ports and the VLAN-IDs and the like.

In the example of FIG. 2, since the VLAN-ID corresponding to the port 4-1 is "1001", "1001" is assigned to the Ethernet frame as the VLAN-ID.

However, if the video cable 2-1 of the monitoring camera 1-1 is erroneously connected to the port 4-2, since the Ethernet frame distributed from the monitoring camera 1-1 is input to the port 4-2, "1002" is assigned to the Ethernet frame as the VLAN-ID.

Incidentally, since the ID assigning attributes of the ports 4-1-4-3 are "assign", Ethernet frames input via the ports 4-1-4-3 are provided with the VLAN-IDs by the ID assigning unit 5. However, since the ID assigning attribute of the port 4-4 is "not assign" in the example of FIG. 2, an Ethernet frame input via the port 4-4 (an Ethernet frame containing an IP packet storing the control information distributed from the video monitoring device 7) is not provided with the VLAN-ID by the ID assigning unit 5.

When the ID assigning unit 5 adds the VLAN-ID to the Ethernet frame, the communication control unit 6 of the Ethernet switch 3 refers to the IP address of the transmission destination included in the IP header of the IP packet in the Ethernet frame, and transfers the VLAN-ID-attached Ethernet frame to the IP address.

More specifically, when the communication control unit 6 transfers the VLAN-ID-attached Ethernet frame, it refers to the table of FIG. 2 to confirm the port corresponding to the VLAN-ID, and supplies the VLAN-ID-attached Ethernet frame to the port, thereby transferring the Ethernet frame to the video monitoring device 7.

In the case where "1001" is assigned as the VLAN-ID, since the port corresponding to the VLAN-ID "1001" is only the port 4-4, to which the video cable 8 of the video monitoring device 7 is connected, besides the port 4-1 to which the video cable 2-1 of the monitoring camera 1-1 is connected, the VLAN-ID-attached Ethernet frame is supplied to the port 4-4 so that the Ethernet frame is transferred to the video monitoring device 7.

Incidentally, even if the video cable 2-1 of the monitoring camera 1-1 is erroneously connected to the port 4-2 and "1002" is assigned as the VLAN-ID, since the port corresponding to the VLAN-ID "1002" is only the port 4-4, to which the video cable 8 of the video monitoring device 7 is connected, besides port 4-2 to which the video cable 2-1 of the monitoring camera 1-1 is connected, the VLAN-ID-attached Ethernet frame is supplied to the port 4-4 so that the Ethernet frame is transferred to the video monitoring device 7.

The NIC 9 of the video monitoring device 7, which is an interface device that receives only an Ethernet frame to which a specified VLAN-ID is assigned, accepts receiving the VLAN-ID-attached Ethernet frame transferred from the Ethernet switch 3, and transfers the Ethernet frame to the ID deciding unit 10.

The ID deciding unit 10 of the video monitoring device 7, receiving the VLAN-ID-attached Ethernet frame from the NIC 9, reads the VLAN-ID attached to the Ethernet frame using a RAW socket, for example. Here, although it reads the VLAN-ID using the RAW socket, it can read the VLAN-ID using a means other than the RAW socket.

When the ID deciding unit 10 reads the VLAN-ID attached to the Ethernet frame, it refers to the table of FIG. 2 and specifies the port 4 corresponding to the VLAN-ID, thereby identifying the port 4 to which the video cable 2-1 of the monitoring camera 1-1 which is the distribution source of the Ethernet frame is connected.

For example, when "1001" is assigned as the VLAN-ID, the ID deciding unit 10 identifies that the port to which the video cable 2-1 of the monitoring camera 1-1 is connected is the port 4-1, and when "1002" is assigned as the VLAN-ID, it identifies that the port to which the video cable 2-1 of the monitoring camera 1-1 is connected is the port 4-2.

When the ID deciding unit 10 identifies the port 4 to which the video cable 2-1 of the monitoring camera 1-1 which is the distribution source of the Ethernet frame is connected, the data processing unit 11 of the video monitoring device 7 displays the port 4 on the display not shown, for example.

For example, when "1001" is assigned as the VLAN-ID, the display shows that the port to which the video cable 2-1 of the monitoring camera 1-1 is connected is the port 4-1. Accordingly, when a construction manager or the like of the video monitoring system watches the display, for example, he or she can rightly confirm that the video cable 2-1 of the monitoring camera 1-1 is connected correctly.

In contrast, when "1002" is assigned as the VLAN-ID, the display shows that the port to which the video cable 2-1 of the monitoring camera 1-1 is connected is the port 4-2. Accordingly, when the construction manager or the like of the video monitoring system watches the display, for example, he or she can confirm that the video cable 2-1 of the monitoring camera 1-1 is erroneously connected to the port 4-2.

In addition, the data processing unit 11 performs, on the shooting information stored in the IP packet contained in the Ethernet frame, the media processing corresponding to the VLAN-ID "1001" or port 4-1 (such as setting prescribed image size and/or picture quality, displaying (including output of the audio) and/or recording of the video indicated by the shooting information, or displaying and/or recording of the camera-number-attached video corresponding to the VLAN-ID).

As described above, according to the present embodiment 1, it is configured in such a manner as to comprise a plurality of ports 4 that accept the connection of a video cable 2 of a monitoring camera 1; and the Ethernet switch 3 that assigns, when an Ethernet frame (frame containing an IP packet storing the shooting information) distributed from a monitoring camera 1 is input via a port 4, the VLAN-ID corresponding to the port 4 to the Ethernet frame, and transfers the ID-attached Ethernet frame to the video monitoring device 7, wherein the video monitoring device 7, when receiving the VLAN-ID-attached Ethernet frame transferred from the Ethernet switch 3, reads the VLAN-ID attached to the Ethernet frame using the RAW socket, refers to the VLAN-ID to identify the port 4 to which the video cable 2 of the monitoring camera 1 which is the distribution source of the Ethernet frame is connected. Accordingly, it has an advantage of being able to confirm the port 4 easily to which the video cable 2 of the monitoring camera 1 is connected.

In addition, even if the network is IP-adapted, since physical tags describing the port 4 to be connected can be attached to both ends of the video cable 2, the present embodiment 1 offers an advantage of being able to enable confirming the connection destination of the video cable 2 by only watching the tags.

Embodiment 2

Although the foregoing embodiment 1 does not particularly refer to the setting of an IP address of the monitoring cameras 1-1-1-3, a configuration is also possible which sets, when the video monitoring device 7 identifies the port 4 to which the video cable 2 of the monitoring camera 1 which is the distribution source of an Ethernet frame is connected, the IP address corresponding to the port 4 to the monitoring camera 1.

The following is a concrete example.

When the ID deciding unit 10 identifies that the port to which the video cable 2-1 of the monitoring camera 1-1 which is the distribution source of the Ethernet frame is connected is the port 4-1, for example, the data processing unit 11 of the video monitoring device 7 transfers an Ethernet frame containing an IP packet storing the control information indicating the IP address corresponding to the port 4-1 (Ethernet frame with the VLAN-ID "1001" corresponding to the port 4-1) to the Ethernet switch 3 via the NIC 9 so as to set the IP address corresponding to the port 4-1 to the monitoring camera 1-1.

When the Ethernet frame with the VLAN-ID distributed from the video monitoring device 7 is input via the port 4-4, the communication control unit 6 of the Ethernet switch 3 reads the VLAN-ID "1001", and identifies the port 4-1 corresponding to the VLAN-ID "1001" by referring to the table of FIG. 2.

Then the communication control unit 6 supplies the Ethernet frame to the port 4-1 corresponding to the VLAN-ID "1001" so as to transfer the Ethernet frame to the monitoring camera 1-1.

Receiving the Ethernet frame transferred from the Ethernet switch 3, the monitoring camera 1-1 reads out the control information from the IP packet contained in the Ethernet frame, and sets the IP address indicated by the control information as its own IP address.

Embodiment 3

Although the foregoing embodiment 1 is described by way of example which identifies the port 4, to which the video cable 2 of the monitoring camera 1 which is the distribution source of the Ethernet frame is connected, and displays the port, a configuration is also possible in which the video monitoring device 7 compares the VLAN-ID attached to the Ethernet frame with the IP address of the monitoring camera 1 which is the distribution source of the Ethernet frame, and displays, if the combination of the VLAN-ID and the IP address differs from a preset combination, the information indicating that the port 4 is a wrong port as the connection destination of the monitoring camera 1 on the display not shown.

The following is a concrete example.

As for the processing other than that of the video monitoring device 7, since it is the same as that of the foregoing embodiment 1, only the processing contents of the video monitoring device 7 will be described.

Here, an example will be described in which the video cable 2-1 of the monitoring camera 1-1 is erroneously connected to the port 4-2.

When the ID deciding unit 10 of the video monitoring device 7 receives a VLAN-ID-attached Ethernet frame from the NIC 9, it reads the VLAN-ID attached to the Ethernet frame using a RAW socket, for example.

In this example, since the video cable 2-1 of the monitoring camera 1-1 is erroneously connected to the port 4-2, the VLAN-ID "1002" corresponding to the port 4-2 is added.

The ID deciding unit 10, reading the VLAN-ID "1002" attached to the Ethernet frame, identifies the port 4-2 corresponding to the VLAN-ID "1002" by referring to the table of FIG. 2, and identifies the transmission source IP address (IP address of the monitoring camera 1-1) assigned to the Ethernet frame.

For convenience of explanation, it is assumed here that the IP address of the monitoring camera 1-1 is "10.1.1.101".

The ID deciding unit 10 compares the port 4-2 corresponding to VLAN-ID "1002" with the IP address "10.1.1.101" of the monitoring camera 1-1, and decides on whether the combination of the VLAN-ID and the IP address is the preset combination.

More specifically, the ID deciding unit 10 decides on whether the combination of the port 4-2 corresponding to VLAN-ID "1002" and the IP address "10.1.1.101" is preset by referring to the table of FIG. 2.

In the example of FIG. 2, since the IP address corresponding to the VLAN-ID "1002" is "10.1.1.102", it decides that the foregoing combination has not been set in advance.

If the ID deciding unit 10 decides that the foregoing combination has not been preset, it recognizes that the video cable 2-1 of the monitoring camera 1-1 is erroneously connected to the port 4-2.

The data processing unit 11 of the video monitoring device 7 displays the recognition result of the ID deciding unit 10 on the display not shown. Alternatively, the ID deciding unit 10 outputs the information indicating the recognition result to an external device or the like.

This enables a construction manager or the like of the video monitoring system, for example, to confirm easily that the video cable 2-1 of the monitoring camera 1-1 is erroneously connected to the port 4-2 without referring to the table indicating the connection destination of the video cable 2 of the monitoring camera 1, thereby offering an advantage of being able to make the confirming processing more easily than the foregoing embodiment 1.

Embodiment 4

Figure 3:
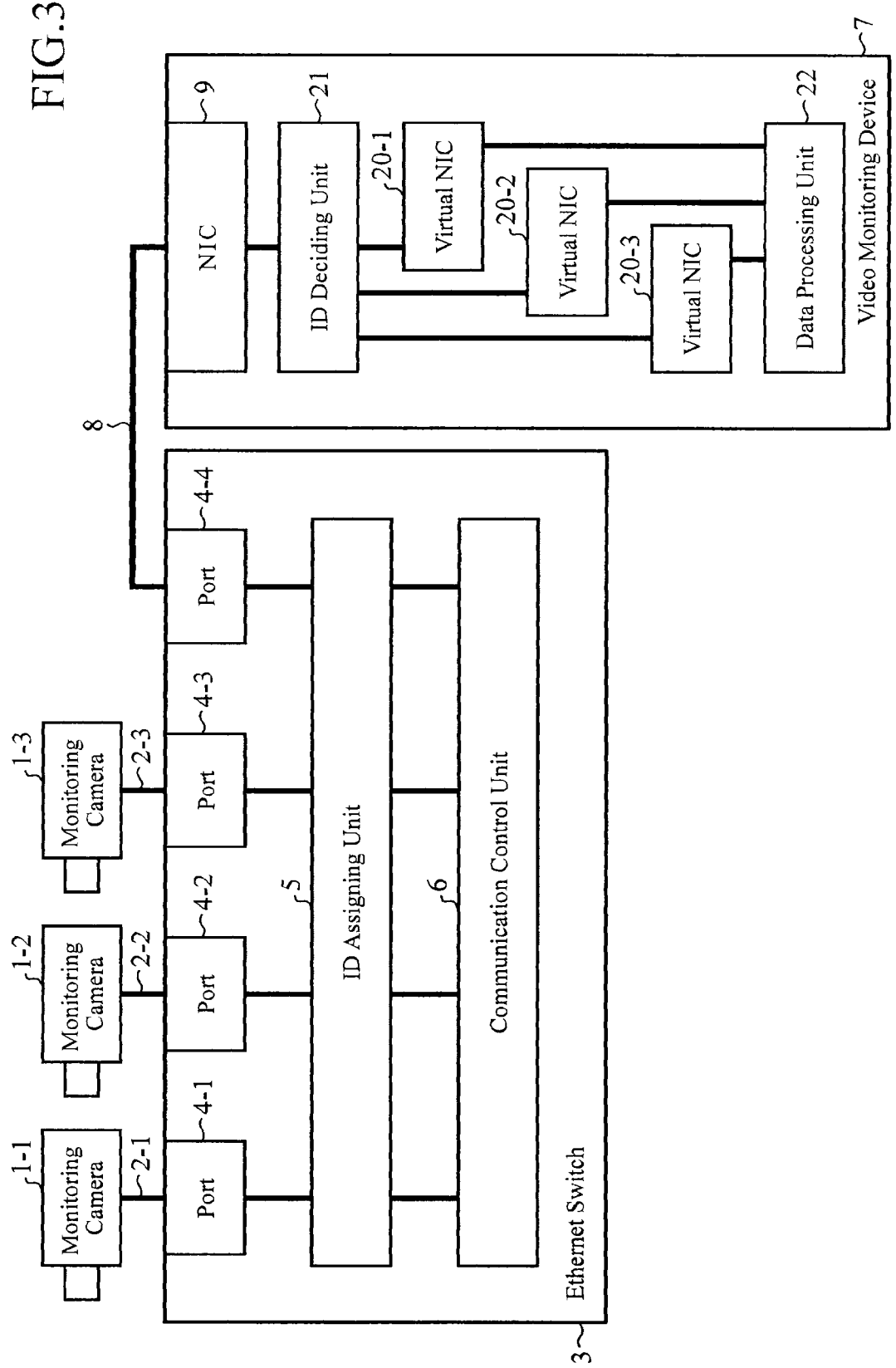
FIG. 3 is a block diagram showing a configuration of a video monitoring system of an embodiment 4 in accordance with the present invention.

FIG. 3 is a block diagram showing a configuration of a video monitoring system of an embodiment 4 in accordance with the present invention. In FIG. 3, since the same reference numerals as those of FIG. 1 designate the same or like components, their description will be omitted.

Virtual NICs 20-1-20-3 are a virtual input/output units virtually built by software. However, the virtual NICs 20-1-20-3 can be built using a semiconductor integrated circuit incorporating a CPU or using a single-chip microcomputer.

An ID deciding unit 21, which comprises a semiconductor integrated circuit incorporating a CPU or comprises a single-chip microcomputer, executes the processing that when the NIC 9 receives a VLAN-ID-attached Ethernet frame, reads the VLAN-ID attached to the Ethernet frame using a RAW socket, identifies the virtual NIC 20 corresponding to the VLAN-ID by referring to the table of FIG. 4, and transfers the Ethernet frame to the virtual NIC 20.

The ID deciding unit 21 differs from the ID deciding unit 10 in FIG. 1 in that it does not execute the processing of identifying the port 4 to which the video cable 2 of the monitoring camera 1 which is the distribution source of the Ethernet frame is connected.

A data processing unit 22, which comprises a semiconductor integrated circuit incorporating a CPU or comprises a single-chip microcomputer, receives the Ethernet frame transferred to one of the virtual NICs 20-1-20-3 by using a socket corresponding to the virtual NICs 20-1-20-3 (an ordinary socket can be used instead of the RAW socket), and performs, on the shooting information stored in the IP packet contained in the Ethernet frame, the media processing corresponding to the virtual NIC 20 (such as setting prescribed image size and/or picture quality, and displaying (including audio output) or recording of the video indicated by the shooting information, or displaying or recording the camera-number-attached video data corresponding to the VLAN-ID).

In addition, when receiving an Ethernet frame transferred to one of the virtual NICs 20-1-20-3, the data processing unit 22 executes the processing that identifies the port 4 to which the video cable 2 of the monitoring camera 1 which is the distribution source of the Ethernet frame is connected in the same manner as the ID deciding unit 10 of FIG. 1, or detects a connection error of the video cable 2 shown in the foregoing embodiment 3.

Next, the operation will be described.

Since the processing other than that of the video monitoring device 7 is the same as that of the foregoing embodiments 1-3, only the processing of the video monitoring device 7 will be described.

FIG. 4 is a diagram showing an example of a table representing the correspondence between the ports, VLAN-IDs, monitoring cameras and virtual NICs.

The NIC 9 of the video monitoring device 7, which is an interface device that receives only a specific VLAN-ID-attached Ethernet frame, accepts the VLAN-ID-attached Ethernet frame transferred from the Ethernet switch 3 in the same manner as the foregoing embodiment 1, and transfers the Ethernet frame to the ID deciding unit 21.

When the NIC 9 receives a VLAN-ID-attached Ethernet frame, the ID deciding unit 21 reads the VLAN-ID attached to the Ethernet frame using the RAW socket.

Then the ID deciding unit 21 identifies the virtual NIC 20 corresponding to the VLAN-ID by referring to the table of FIG. 4, and transfers the Ethernet frame to the virtual NIC 20.

For example, if the VLAN-ID attached to the Ethernet frame is "1001", it transfers the Ethernet frame to the virtual NIC 20-1, if the VLAN-ID is "1002", it transfers the Ethernet frame to the virtual NIC 20-2, and if the VLAN-ID is "1003", it transfers the Ethernet frame to the virtual NIC 20-3.

The data processing unit 22 receives the Ethernet frame transferred to any one of the virtual NICs 20-1-20-3 by using the socket corresponding to the virtual NICs 20-1-20-3 (not only a RAW socket but also an ordinary socket can be used).

When receiving the Ethernet frame transferred to any one of the virtual NICs 20-1-20-3, the data processing unit 22 executes the processing of identifying the port 4 to which the video cable 2 of the monitoring camera 1 which is the distribution source of the Ethernet frame is connected in the same manner as the ID deciding unit 10 of FIG. 1, or executes the processing of detecting the connection error of the video cable 2 shown in the foregoing embodiment 3.

In addition, the data processing unit 22 performs, on the shooting information stored in the IP packet contained in the Ethernet frame, the media processing corresponding to the virtual NIC 20 (such as setting prescribed image size and/or picture quality, and displaying (including audio output) or recording of the video indicated by the shooting information, or displaying or recording the camera-number-attached video data corresponding to the VLAN-ID).

As described above, according to the present embodiment 4, it is configured in such a manner that when it comprises the virtual NICs 20-1-20-3 virtually built by software, and when it receives the VLAN-ID-attached Ethernet frame transferred from the Ethernet switch 3, it identifies the virtual NIC 20 corresponding to the VLAN-ID attached to the Ethernet frame, transfers the Ethernet frame to the virtual NIC 20, and executes the media processing corresponding to the virtual NIC 20 on the shooting information stored in the IP packet contained in the Ethernet frame. Accordingly, it offers, in addition to the same advantages of the foregoing embodiments 1-3, an advantage of being able to facilitate the system development.

More specifically, since the virtual NICs 20-1-20-3 can be implemented in driver software and the ID deciding unit 21 can also be implemented in driver software, when implementing the ID deciding unit 21 in driver software, it is only necessary to develop the data processing unit 22, which offers an advantage of facilitating the development of the video monitoring device 7.

Incidentally, it is to be understood that a free combination of the individual embodiments, variations of any components of the individual embodiments or removal of any components of the individual embodiments are possible within the scope of the present invention.

INDUSTRIAL APPLICABILITY

As described above, a video monitoring system in accordance with the present invention enables confirming the ports to which the video cables of the monitoring cameras are connected with ease. Accordingly, it is suitable for an application to a video monitoring system that receives the shooting information (video and/or audio data) distributed from the monitoring cameras and that executes video display or video recording of the monitoring areas in accordance with the shooting information.

DESCRIPTION OF REFERENCE SYMBOLS

1-1-1-3 monitoring camera; 2-1-2-3 video cable of monitoring camera; 3 Ethernet switch; 4-1-4-4 port; 5 ID assigning unit; 6 communication control unit; 7 video monitoring device; 8 video cable of video monitoring device; 9 NIC; 10 ID deciding unit; 11 data processing unit; 20-1-20-3 virtual NICs (virtual input/output units); 21 ID deciding unit; 22 data processing unit.

What is claimed is:
1. A network system comprising:
one or more network devices of distribution sources;
a network processor that includes a plurality of ports accepting connection to cables of the network devices of distribution sources, wherein, when data distributed from one of the network devices of distribution sources is input through one of the ports, the network processor attaches an ID corresponding to said one of the ports to the input data and transfers the ID-attached data; and
a network device of distribution destination that has a function of receiving the ID-attached data transferred from the network processor and identifying, by referring to the ID attached to the received data, the port connecting to the cable of the network device of distribution source of the received data; wherein
when an Ethernet frame including an IP packet is distributed and is input through one of the ports, the network processor attaches a Virtual Local Area Network Identifier (VLAN-ID) corresponding to said one of the ports to the input Ethernet frame and transfers the VLAN-ID-attached Ethernet frame, the IP packet containing data of the network device of distribution source, and
the network device of distribution destination comprises a plurality of virtual input/output units that is virtually built by software,
identifies, when receiving the VLAN-ID-attached Ethernet frame transferred from the network processor, one of the virtual input/output unit corresponding to the VLAN-ID attached to the received Ethernet frame,
supplies the received Ethernet frame to the identified virtual input/output unit, and
performs a process on the data contained in the IP packet of the Ethernet frame, the process corresponding to the identified virtual input/output unit.

2. The network system according to claim 1, wherein each of the network devices of distribution sources is a monitoring camera that shoots a monitoring area, and the network device of distribution destination is a video monitoring device.

3. The network system according to claim 2, wherein each of the cables is a video cable, and the data are shooting data.

4. The network system according to claim 1, wherein the network device of distribution destination sets, for the network device of distribution source, an IP address corresponding to the identified port.

5. The network system according to claim 1, wherein the network device of distribution destination compares the ID attached to the received data with an IP address of the network device of distribution source, and
outputs, when the compared ID and IP address differs from a preset combination, information indicating that the port connecting to the network device of distribution source is wrong.

6. The network system according to claim 1, wherein
when an Ethernet frame including an IP packet is distributed and is input through one of the ports, the network processor attaches a Virtual Local Area Network Identifier (VLAN-ID) corresponding to said one of the ports to the input Ethernet frame and transfers the VLAN-ID-attached Ethernet frame, the IP packet containing data of the network device of distribution source, and
when receiving the VLAN-ID-attached Ethernet frame transferred from the network processor, the network device of distribution destination reads the VLAN-ID attached to the received Ethernet frame by using a RAW socket, and identifies, by referring to the read VLAN-ID, the port connecting to the cable of the network device of distribution source of the received Ethernet frame.

7. A network switch comprising:
a processor including a plurality of ports that accepts connection to cables of a network devices of distribution sources, and
a memory storing instructions which when executed by the processor, and when data distributed from one of the network devices of distribution sources is input through one of the ports, cause an ID corresponding to said one of the ports to be attached to the input data and the ID-attached data to be transferred and identifying, by referring to the ID attached to the received data, the port connecting to the cable of the network device of distribution source of the received data; wherein
when an Ethernet frame including an IP packet is distributed and is input through one of the ports, the processor attaches a Virtual Local Area Network Identifier (VLAN-ID) corresponding to said one of the ports to the input Ethernet frame and transfers the VLAN-ID-attached Ethernet frame, the IP packet containing data of a network device of distribution source,
the network switch comprises a plurality of virtual input/output units that is virtually built by software, and
the processor identifies, when receiving the VLAN-ID-attached Ethernet frame, one of the virtual input/output unit corresponding to the VLAN-ID attached to the received Ethernet frame, supplies the received Ethernet frame to the identified virtual input/output unit, and performs a process on the data contained in the IP packet of the Ethernet frame, the process corresponding to the identified virtual input/output unit.

8. The network switch according to claim 7, wherein each of the network devices of distribution sources is a monitoring camera, and the network device of distribution destination is a video monitoring device.

9. The network switch according to claim 8, wherein each of the cables is a video cable, and the data are shooting data.

10. The network switch according to claim 7, wherein, when an Ethernet frame including an IP packet is distributed and is input through one of the ports, the processor attaches a Virtual Local Area Network Identifier (VLAN-ID) corresponding to said one of the ports to the input Ethernet frame and transfers the VLAN-ID-attached Ethernet frame, the IP packet containing data of the network device of distribution source.

11. A network device of distribution destination comprising:
a network processor that includes a plurality of ports accepting connection to cables of network devices of distribution sources, wherein, when data distributed from one of the network devices of distribution sources is input through one of the ports, the network processor attaches an ID corresponding to said one of the ports to the input data and transfers the ID-attached data, and
a receiver which receives the ID-attached data transferred from the network processor and
a processor which identifies, by referring to the ID attached to the received data, the port connecting to the cable of the network device of distribution source of the received data; wherein
when an Ethernet frame including an IP packet is distributed and is input through one of the ports, the network processor attaches a Virtual Local Area Network Identifier (VLAN-ID) corresponding to said one of the ports to the input Ethernet frame and transfers the VLAN-ID-attached Ethernet frame, the IP packet containing data of the network device of distribution source, and
the network device of distribution destination
comprises a plurality of virtual input/output units that is virtually built by software,
identifies, when receiving the VLAN-ID-attached Ethernet frame transferred from the network processor, one of the virtual input/output unit corresponding to the VLAN-ID attached to the received Ethernet frame,
supplies the received Ethernet frame to the identified virtual input/output unit, and
performs a process on the data contained in the IP packet of the Ethernet frame, the process corresponding to the identified virtual input/output unit.

12. The network device of distribution destination according to claim 11, wherein each of the network devices of distribution sources is a monitoring camera.

13. The network device of distribution destination according to claim 12, wherein each of the cables is a video cable, and the data are shooting data.

14. The network device of distribution destination according to claim 11, wherein the network device of distribution destination sets, for the network device of distribution source, an IP address corresponding to the identified port.

15. The network device of distribution destination according to claim 11, wherein the processor compares the ID attached to the received data with an IP address of the network device of distribution source, and outputs, when the compared ID and IP address differs from a preset combination, information indicating that the port connecting to the network device of distribution source is wrong.

16. The network device of distribution destination according to claim 11, wherein when an Ethernet frame including an IP packet is distributed and is input through one of the ports, the network processor attaches a Virtual Local Area Network Identifier (VLAN-ID) corresponding to said one of the ports to the input Ethernet frame and transfers the VLAN-ID-attached Ethernet frame, the IP packet containing data of the network device of distribution source, and when receiving the VLAN-ID-attached Ethernet frame transferred from the network processor, the network device of distribution destination reads the VLAN-ID attached to the received Ethernet frame by using a RAW socket, and identifies, by referring to the read VLAN-ID, the port connecting to the cable of the network device of distribution source of the received Ethernet frame.

\* \* \* \* \*